(12) United States Patent
Hörnig

(10) Patent No.: US 7,912,261 B2
(45) Date of Patent: Mar. 22, 2011

(54) METHOD FOR CORRECTING A RAW X-RAY IMAGE, AND AN X-RAY DIAGNOSTIC SYSTEM

(75) Inventor: Mathias Hörnig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1029 days.

(21) Appl. No.: 11/727,463

(22) Filed: Mar. 27, 2007

(65) Prior Publication Data

US 2007/0230766 A1   Oct. 4, 2007

(30) Foreign Application Priority Data

Mar. 28, 2006   (DE) .................. 10 2006 014 342

(51) Int. Cl.
G06K 9/00 (2006.01)
H05G 1/64 (2006.01)

(52) U.S. Cl. .................. 382/128; 382/274; 378/98.8

(58) Field of Classification Search .................. 382/100, 382/128, 129, 130, 131, 132.133, 134, 168, 382/173, 181, 194, 232, 255, 274, 275, 276, 382/305, 289; 250/370.09, 581; 378/185, 378/207, 98.8

See application file for complete search history.

(56) References Cited

U.S. PATENT DOCUMENTS

| 5,008,920 | A * | 4/1991 | Gralak .................. 378/185 |
| 6,379,044 | B1 * | 4/2002 | Vastenaeken et al. ........ 378/207 |
| 7,329,890 | B2 * | 2/2008 | Fletcher-Heath et al. .... 250/581 |
| 2001/0016057 | A1 * | 8/2001 | Eck et al. .................. 382/132 |
| 2003/0016788 | A1 * | 1/2003 | Spahn .................. 378/98.8 |
| 2004/0200971 | A1 * | 10/2004 | De Keyser .................. 250/370.09 |

FOREIGN PATENT DOCUMENTS

DE    100 22 407 A1    11/2001
DE    101 35 427 A1    2/2003

* cited by examiner

Primary Examiner — Seyed Azarian
(74) Attorney, Agent, or Firm — Harness, Dickey & Pierce, PLC

(57) ABSTRACT

In order to ensure the preparation of an undistorted X-ray image of an examination image by an X-ray detector including an active pixel matrix with at least two detector plates, a method is provided. In at least one embodiment, a method for correcting a raw X-ray image includes changing, as a function of a deviation between correction values from pixel readout elements of a first detector plate and correction values from pixel readout elements of at least one further detector plate, the correction values of pixel readout elements of at least one detector plate, or preparing new correction values for the pixel readout elements of at least one detector plate. Further, the method in at least one embodiment includes carrying out a correction of the raw X-ray image with the changed correction values, or a carrying out a correction with the original correction values and the new correction values.

19 Claims, 3 Drawing Sheets

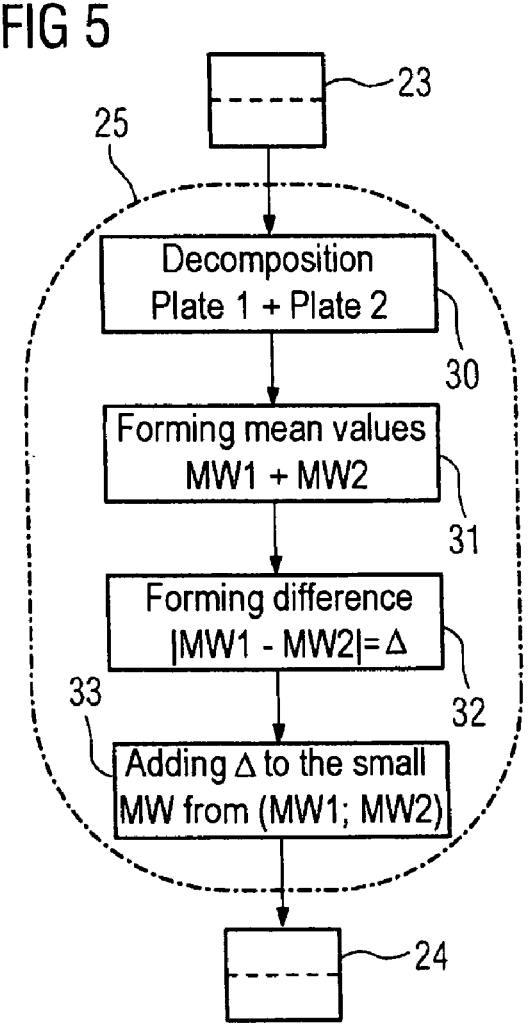
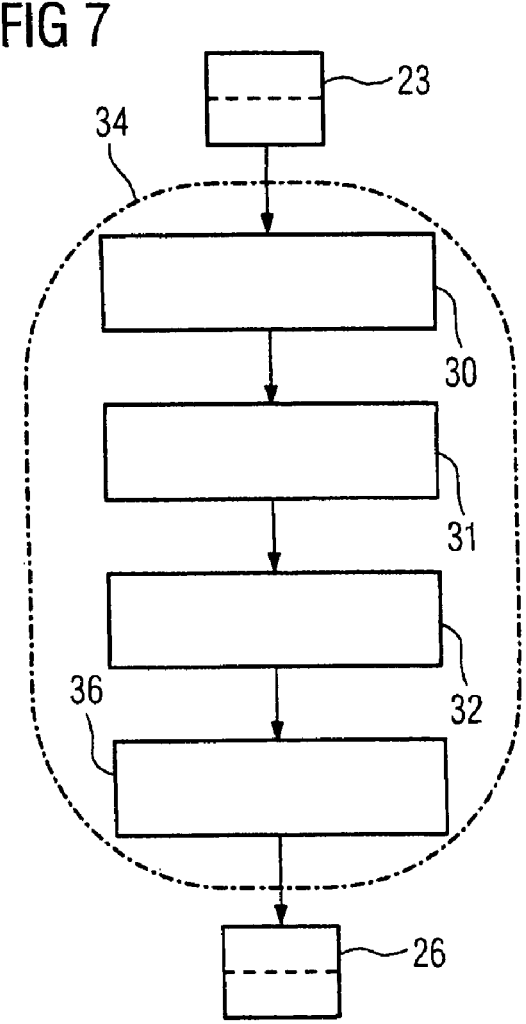
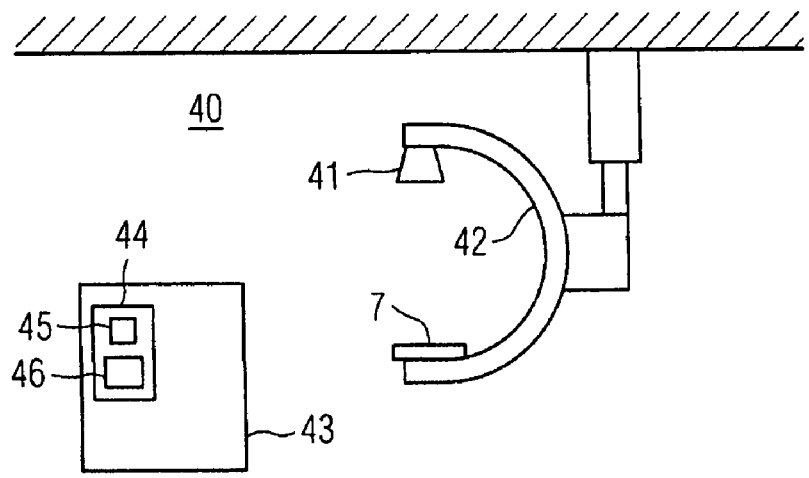

METHOD FOR CORRECTING A RAW X-RAY IMAGE, AND AN X-RAY DIAGNOSTIC SYSTEM

PRIORITY STATEMENT

The present application hereby claims priority under 35 U.S.C. §119 on German patent application number DE 10 2006 014 342.6 filed Mar. 28, 2006, the entire contents of which is hereby incorporated herein by reference.

FIELD

Embodiments of the application generally relate to a method for correcting a raw X-ray image and/or an X-ray diagnostic system.

BACKGROUND

X-ray detectors designed as solid state detectors are known in X-ray imaging for the purpose of taking digital X-ray images of an examination object. In this case, an x-radiation is converted with the aid of a converter layer into electric charge and subsequently read out electronically by means of a downstream active matrix that includes a multiplicity of individual pixel readout elements arranged in rows. Subsequently, the imaging data representing the examination results are further processed for the image preparation, for example by correcting dark currents (noise) or sensitivity differences from the raw image data, that is to say the raw image data of the respective raw X-ray image.

It is known to carry out line noise correction (LNC) in order to correct the dark currents. To this end, at least one dark image value is picked up for each line and subtracted electronically from the raw image values of the respective line during the image preparation from pixel readout elements in edge regions of the active pixel matrix which are not fronted by a converter layer and which, in addition, are shielded with lead (Dark Reference Zone=DRZ).

It is known, furthermore, to prepare an offset image from dark image values for a correction of the dark currents, that is to say to take a picture without x-radiation and without the examination object, and to subtract it electronically from the raw image values after acquisition of the latter. The frequency with which the dark image values are picked up or offset images are prepared can vary; thus, a new offset image can be prepared, or a time interval can be selected for each X-ray picture.

Known active detector matrices have a detector plate made from amorphous silicon, for example a so called a-Si plate. In order to produce large area solid state detectors, a number of detector plates, for example, two, four or eight a-Si plates, are bonded to one another by way of a butting process. Even after a correction of the dark current on the X-ray image, striking brightness differences between different detector plates are often detected in the case of such compound active detector matrices. One cause of these so called half panel visibilities result from the use of detector plates made from different production runs. Even tiny differences during production can effect a large difference in the dark current.

SUMMARY in at least one embodiment of the present invention, a method is provided by which an undistorted X-ray image of an examination object can be obtained by way of an X-ray detector with an active pixel matrix composed from at least two detector plates. In at least one embodiment of the present invention, an X-ray diagnostic device is provided.

The inventive correction method of at least one embodiment offers the possibility for brightness differences and differences in the level of noise between image values read out from different detector plates to be reduced or completely avoided in the corrected X-ray image in a simple and reliable way in that either, as a function of a deviation between correction values, in particular dark image values, from pixel readout elements of a first detector plate and correction values, in particular dark image values, from pixel readout elements of at least one further detector plate, the correction values from pixel readout elements of at least one detector plate are changed and a correction of the raw X-ray image is carried out with the changed correction values, or, as a function of a deviation between correction values, in particular dark image values, from pixel readout elements of a first detector plate and correction values, in particular dark image values, from pixel readout elements of at least one further detector plate, new correction values for the pixel readout elements of at least one detector plate are prepared, or a correction is carried out with the original correction values and the new correction values.

The imaging accuracy is improved, and thus a diagnosis with the aid of the X-ray image is simplified overall by the reduction or avoidance of such artifacts, in particular brightness artifacts, on the finished X-ray image. Because of its low complexity, the inventive correction of at least one embodiment is also suitable for applications with a high image rate, in particular for dynamic X-ray applications. Moreover, the inventive correction of at least one embodiment is particularly advantageous for X-ray applications with a low to intermediate X-ray dose, since static structures on such X-ray images are particularly conspicuous.

The correction is advantageously carried out in at least one embodiment, in the context of an offset correction. In this context, an offset image is prepared from the changed dark image values, and an offset correction is therefore carried out, or an offset image is prepared from the original dark image values, and a new correction image is prepared from the new dark image values, and firstly an offset correction is prepared with the original offset image, and subsequently a further correction is prepared with the new correction image.

According to one refinement of at least one embodiment of the invention, the deviation is minimized by mutual matching of the correction values. According to a design of at least one embodiment of the invention that produces a particularly exact result, the deviation is reduced or even minimized by carrying out a normalization of correction values of a first correction image, in particular to a value of one, and a further correction image is divided electronically in pixelwise fashion by the normalized correction image.

According to a further refinement of at least one embodiment of the invention, the deviation is determined by a comparison of correction values from pixel readout elements of the first detector plate with correction values from pixel readout elements of at least one further detector plate. In this context, it is possible for example, to compare with one another dark image values recorded in the DRZ of the first detector plate and in the DRZ of a second detector plate, and to determine the deviation therefrom. In general, the deviation is to be understood as a deviation averaged over a detector row, for example.

In an advantageous way for a further simplification of at least one embodiment of the correction method, the deviation is determined by a comparison of the mean value of correction values from pixel readout elements of the first detector plate with the mean value of correction values from pixel readout elements of at least one further detector plate.

According to a refinement of at least one embodiment of the invention that can be embodied with particular lack of outlay, the deviation is reduced or even minimized by forming an absolute difference value of the mean values, and the absolute difference value is added to the correction values of the detector plate with the lower mean value, or subtracted from the correction values of the detector plate with the higher mean value.

In an advantageous way, at least one embodiment of the correction method is respectively carried out separately for each recording mode. Since different recording modes have, for example, different dark currents, it is thereby ensured that differences between the deviations can be taken into account systematically.

According to a further refinement of at least one embodiment of the invention, the new correction values from pixel readout units of the detector plate with the lower mean value are set to the value of the deviation, and the remaining new correction values are set to the value zero, and first the original correction values and then the new correction values are subtracted from the raw values of the raw X-ray image in pixelwise fashion. As an alternative to this, it is also possible for the new correction values from pixel readout units of the detector plate with the higher mean value to be set to the value of the deviation, and the remaining new correction values to be set to the value zero, and the original correction values to be added to the raw values of the raw X-ray image, and subsequently the new correction values to be subtracted from the corrected raw values of the raw X-ray image.

A dark image value is understood below either as a value of a pixel readout element recorded directly without x-radiation and without an examination object, or a value generated electronically from a number of such values. By contrast, an offset value is understood always as that value of a pixel readout element which is used for the actual correction of a raw value of a raw X-ray image.

BRIEF DESCRIPTION OF THE DRAWINGS

The invention and further advantageous refinements in accordance with the features of the claims and subclaims are explained in more detail below with the aid of schematically illustrated example embodiments in the drawings, without thereby limiting the invention to these example embodiments. In the drawings:

FIG. 5 shows a method for preparing an offset image for the correction method in accordance with FIG. 4;

FIG. 7 shows a method for preparing a new correction image for the correction method in accordance with FIG. 4;

FIG. 9 shows an example embodiment of an inventive x-ray diagnostic system with an X-ray source, an X-ray detector and a correction unit.

DETAILED DESCRIPTION OF THE EXAMPLE EMBODIMENTS

Figure 1:
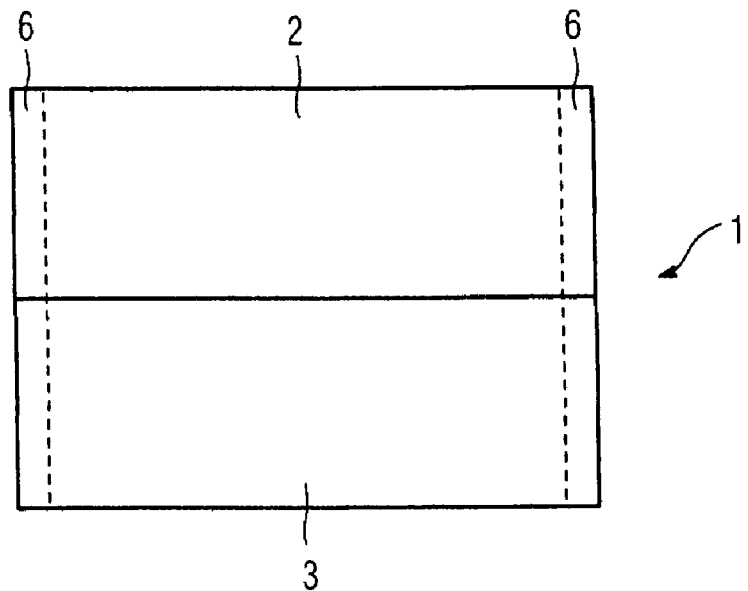
FIG. 1 shows an active matrix of an X-ray detector that is composed of two detector plates.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

Figure 2:
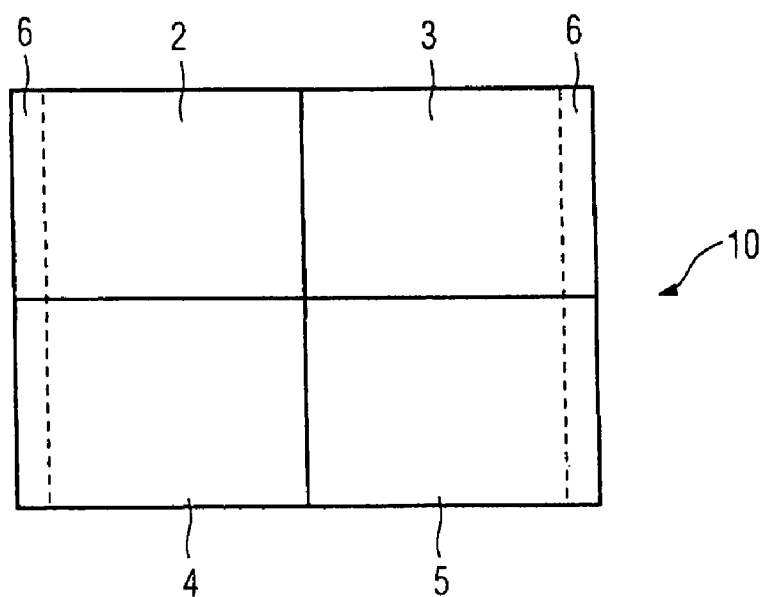
FIG. 2 shows an active matrix of an X-ray detector that is composed of four detector plates.

FIG. 1 shows a first active matrix 1 of an X-ray detector that includes a first detector plate 2 and a second detector plate 3. FIG. 2 shows an active matrix 10 that includes four detector plates, that is to say additionally further has a third detector plate 4 and a fourth detector plate 5. The detector plates are bonded to a glass substrate, for example by butting together. The dark zones 6 (DRZ) of the respective detector plates are located at the edge of the active matrix.

Figure 3:
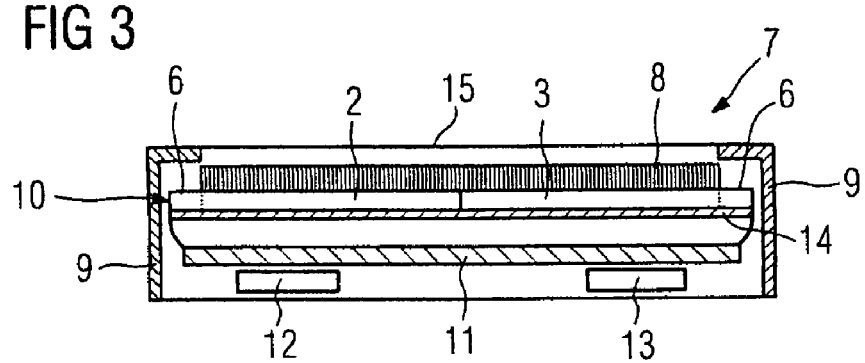
FIG. 3 shows a section through an X-ray detector with an active matrix according to FIG. 2.

FIG. 3 shows a section through a flat detector 7 whose active matrix 10 is composed, like that shown in FIG. 2, of four detector plates. The flat detector 7 is surrounded by a housing 15. Located in the interior of the housing 15 on the side facing the x-radiation is a scintillator layer 8, and located therebelow is the active matrix 10, which is composed of the first detector plate 2, the second detector plate 3 and two further detector plates and is bonded to a glass substrate 14. The regions of the active matrix 10 over which no scintillator layer 8 is located are additionally protected against x-radiation by a lead shield 9 and are denoted as dark zones (DRZ) 9. The flat detector further has an electronic system 11, a rechargeable battery 12 and a transceiving unit 13.

Figure 4:
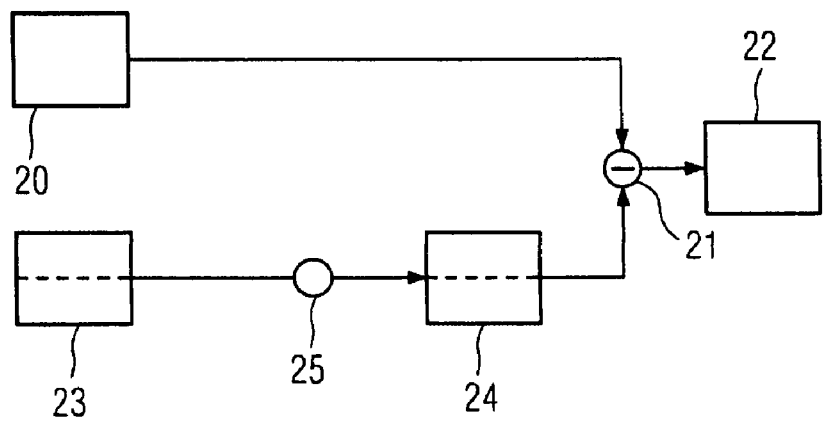
FIG. 4 shows an example embodiment of inventive correction method for an X-ray detector composed of two detector plates.

FIG. 4 shows a schematic cycle of an example embodiment of an inventive correction in the form of an offset correction from the raw X-ray image 20 up to the offset-corrected image 22 in the case of an active matrix, composed of two detector plates, of an X-ray detector. An offset image 24 is determined by a processing procedure 25 from a dark image 23 that has been prepared from dark image values recorded without an examination object and without x-radiation either before or after the actual recording process. The offset image 24 is subtracted electronically from the raw X-ray image 20 in a subtraction process 21, and the offset-corrected image 22 is obtained therefrom.

The dark image values of the dark image 23 can have been directly recorded or already have been determined from further dark image values of a number of recorded dark images, for example by superposition. It is also possible to determine such a dark image 23 from the dark image values that are recorded in the dark zones (DRZ) for corresponding pixel rows, that is to say to generalize the respective dark image value of a pixel row for this pixel row.

A more deeper explanation and an example of the processing procedure 25 of FIG. 4 is shown in detail in FIG. 5. In the course of this processing, the dark image 23 is distinguished in a first step 30, firstly according to the first dark image values, which have been obtained from pixel readout elements of the first detector plate, and according to the second dark image values, which have been obtained from pixel readout elements of the second detector plate. In a second step 31, a first mean value MW1 is calculated from the first dark image values, and a second mean value MW 2 is calculated from the second dark image values.

These two mean values are compared with one another in a third step 32 by forming an absolute difference value $\Delta$ of the first mean value MW1 and of the second mean value MW 2, in which case $\Delta=/MW1-MW2/$. In a fourth step 33, the absolute difference value $\Delta$ is added to all the dark image values of the detector plate with the lower mean value. Alternatively, in the fourth step 33 it is also possible to subtract the absolute difference value $\Delta$ from all the dark image values of the detector plate with the higher mean value, it being necessary in this case to ensure that the dark image values do not change their sign. After these steps have been carried out, the first and the second dark image values are combined to form changed dark image values, and the changed offset image 24 with the aid of which an offset correction of the raw X-ray image is performed is prepared therefrom.

Figure 6:
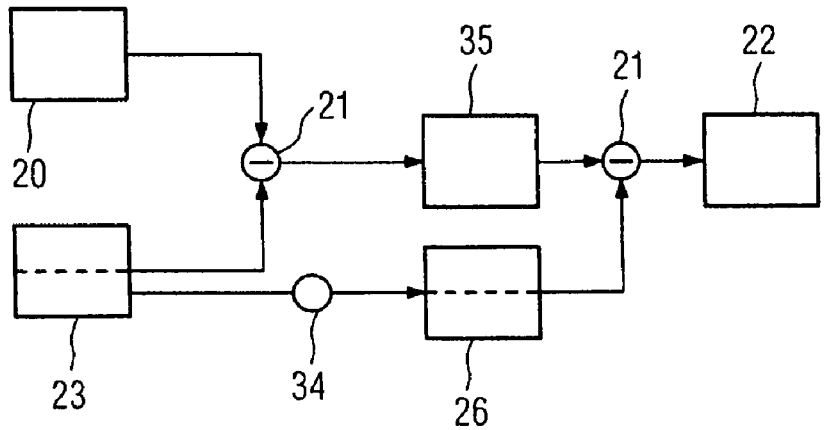
FIG. 6 shows a further an example embodiment of an inventive correction method for an X-ray detector composed of two detector plates.

An alternative method for the offset correction of a raw X-ray image of an X-ray detector including two detector plates is shown in FIG. 6 and FIG. 7. The dark image 23 from recorded dark image values is used here as offset image for the purpose of the offset correction and linked to the raw X-ray image 20 by way of an electronic subtraction 21 such that an offset-corrected intermediate image 35 is produced. As shown in more detail in FIG. 7—an alternative processing procedure 34 is used to prepare a further correction image 26. The further correction image 26 is subtracted from the offset-corrected intermediate image 35 in an electronic subtraction process 21, and the corrected X-ray image 22 is obtained therefrom.

The alternative processing procedure 34 includes the following steps for determining the further correction image 26: in the first step 30, the dark image 23 is distinguished according to the first dark image values and the second dark image values, and in the second step 31 a first mean value MW1 is calculated from the first dark image values and a second mean value MW 2 is calculated from the second dark image values; in a third step 32, an absolute difference value $\Delta$ of the first mean value MW1 and of the second mean value MW 2 is formed, in which case $\Delta=/MW1-MW2/$; in a fifth step 36, the new correction image 26 is prepared by setting the absolute difference value $\Delta$ as correction value instead of dark image values of the detector plate with the lower mean value, and setting zero instead of dark image values of the detector plate with the higher mean value.

Figure 8:
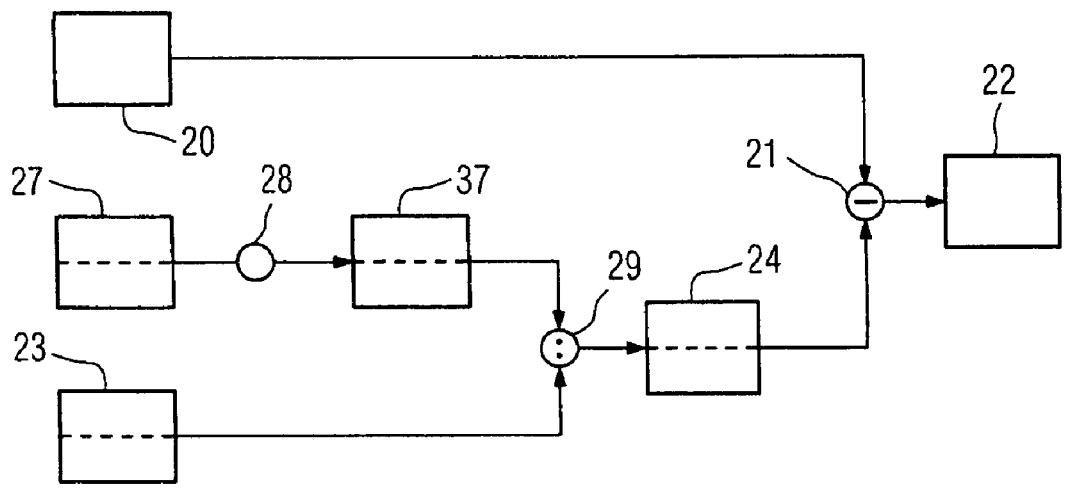
FIG. 8 shows a third example embodiment of an inventive correction method for an X-ray detector composed of two detector plates.

A further design of an embodiment of the invention in the form of a further alternative of an offset correction method is shown in FIG. 8. A second dark image 27 composed of dark image values that was recorded as close as possible in time to the recording of the raw X-ray image 20 is normalized to 1, for example, in a normalization method 28. Subsequently, the original dark image 23 is divided electronically by the now normalized second dark image 37 in a division process 29. The result of this division is the offset image 24.

The methods according to an embodiment of the invention were described in FIGS. 4 to 7 specifically for X-ray detectors with two detector plates. An appropriate adaptation is necessary in the case of X-ray detectors with more than two detector plates. The method in which a normalization is carried out—as described in FIG. 8—is also suitable for more than two detector plates. In a method with formation of mean values—as described in FIG. 4 to FIG. 7—it must be ensured that absolute difference values of the mean values of different detector plates are formed with reference to a detector plate defined as a reference detector plate; in particular, the detector plate with the highest or with the lowest mean value is advantageous here.

Thus, a determination of an offset image for an X-ray detector with an active matrix including four detector plates could look as follows: the respective mean values MW1, MW2, MW3 and MW4 of the dark values are formed for the individual detector plates, then the highest, for example MW4, is selected and the absolute difference values $\Delta 1$, $\Delta 2$, and $\Delta 3$ are formed, in which case $\Delta 1=|MW4-MW1|$, $\Delta 2=|MW4-MW2|$, and $\Delta 3 =|MW4-MW3|$; and subsequently, the absolute difference value belonging to the respective detector plate is added to the original dark values, that is to say $\Delta 1$ is added to all the dark values that belong to pixel readout elements of the first detector plate, $\Delta 2$ is added to all the dark values that belong to pixel readout elements of the second detector plate, etc, and the dark values of the fourth detector plate are not changed.

According to one embodiment of the invention, a dedicated offset image or additional correction image is determined for each recording mode of the X-ray detector. This is advantageous, since the dark currents can differ substantially from one another depending on the mode of operation of the X-ray detector. Moreover, it is advantageous for the frequency with which new offset images are prepared to be raised as a function of the absolute difference value in order to be able to compensate strong deviations, for example owing to temperature increases. This can happen, for example, in the context of threshold values upon the overshooting of which the frequency is raised. It is possible here, in addition, to take account of the recording mode.

Additionally, in the case of a correction designed as an offset correction, it can be provided that the frequency with which an update of the offset image is carried out is raised in the event of a high absolute difference value between different detector plates. In this context, it is possible, for example, to provide for each mode of application a threshold value of the absolute difference value upon the overshooting of which the frequency is raised.

FIG. 9 shows an X-ray diagnostic system 40 according to an embodiment of the invention that is suitable for carrying out a correction method according to an embodiment of the invention. The X-ray diagnostic system 40 has a C-bow 42 that can be rotated about at least one axis and on which an X-ray source 41 and a flat detector 7 are fastened. The X-ray diagnostic system 40 has a control unit 43 with an imaging system for the purpose of control and monitoring. Also located in the control unit 43 is a correction unit 44 that is assigned to the flat detector 7 and has at least one storage element 45 and an image processing unit 46. The above-described corrections according to the invention are carried out by means of the correction unit 44. The correction unit 44 can include additional components such as a variety of software, and can also optionally be arranged on the flat detector 7.

At least one embodiment of the invention may be summarized as follows: in order to ensure the preparation of an undistorted X-ray image of an examination object by way of an X-ray detector with the aid of an active pixel matrix including at least two detector plates, a method is provided for correcting a raw X-ray image, in which, as a function of a deviation between correction values from pixel readout elements of a first detector plate and correction values from pixel readout elements of at least one further detector plate, the correction values of pixel readout elements of at least one detector plate are changed, or new correction values for the pixel readout elements of at least one detector plate are prepared, and a correction of the raw X-ray image is carried out with the changed correction values, or a correction is carried out with the original correction values and the new correction values.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for correcting a raw X-ray image of a digital X-ray detector including an active pixel matrix with pixel readout elements, the matrix including at least two detector plates, the method comprising:
   at least one of
      changing, as a function of a deviation between correction values from pixel readout elements of a first detector plate and correction values from pixel readout elements of at least one further detector plate, the correction values of pixel readout elements of at least one detector plate, and
      preparing, as a function of a deviation between correction values from pixel readout elements of a first detector plate and correction values from pixel readout elements of at least one further detector plate, new correction values for the pixel readout elements of at least one detector plate; and
   carrying out a correction of the raw X-ray image with at least one of the changed correction values, and the original correction values and the new correction values,
   wherein the deviation is reduced by carrying out a normalization of correction values of a correction image, and a further correction image is divided electronically in pixel-wise fashion by the normalized correction image.

2. The method as claimed in claim 1, wherein the method is used for dynamic X-ray applications.

3. The method as claimed in claim 1, wherein the method is respectively carried out for each recording mode.

4. The method as claimed in claim 1, wherein the correction values of dark image values are formed.

5. The method as claimed in claim 4, wherein the correction is performed in a setting of an offset correction.

6. The method as claimed in claim 4, wherein the correction is performed at least one of during and after an offset correction.

7. The method as claimed in claim 1, wherein the correction image is prepared from the changed correction values and is subtracted electronically from the raw X-ray image.

8. The method as claimed in claim 1, wherein the deviation is reduced by carrying out a normalization of correction values of a correction image to a value of one, and wherein a further correction image is divided electronically in pixel-wise fashion by the normalized correction image.

9. A non-transitory computer readable medium including program segments for, when executed on a computer device, the computer device to implement the method of claim 1.

10. An X-ray diagnostic system to carry out the method of claim 1.

11. A method for correcting a raw X-ray image of a digital X-ray detector including an active pixel matrix with pixel readout elements, the matrix including at least two detector plates, the method comprising:
   at least one of
      changing, as a function of a deviation between correction values from pixel readout elements of a first detector plate and correction values from pixel readout elements of at least one further detector plate, the correction values of pixel readout elements of at least one detector plate, and
      preparing, as a function of a deviation between correction values from pixel readout elements of a first detector plate and correction values from pixel readout elements of at least one further detector plate, new correction values for the pixel readout elements of at least one detector plate; and
   carrying out a correction of the raw X-ray image with at least one of the changed correction values, and the original correction values and the new correction values, wherein the deviation is determined by a comparison of a mean value of correction values from pixel readout elements of the first detector plate with a mean value of correction values from pixel readout elements of at least one further detector plate.

12. The method as claimed in claim 11, wherein the deviation is reduced by forming an absolute difference value of the mean values, and the absolute difference value is at least one of added to the correction values of the detector plate with a relatively lower mean value, and subtracted from the correction values of the detector plate with a relatively higher mean value.

13. The method as claimed in claim 11, wherein the new correction values from pixel readout units of the detector plate with a lower mean value are set to the value of the deviation, and the remaining new correction values are set to the value zero and wherein first the original correction values and then the new correction values are subtracted from the raw values of the raw X-ray image in pixel-wise fashion.

14. The method as claimed in claim 11, wherein the new correction values from pixel readout units of the detector plate with a higher mean value are set to the value of the deviation, and the remaining new correction values are set to the value zero, and wherein the original correction values are added to the raw values of the raw X-ray image, and subsequently the new correction values are subtracted from the corrected raw values of the raw X-ray image.

15. An X-ray diagnostic system for carrying out the method of claim 11.

16. A non-transitory computer readable medium including program segments to cause, when executed on a computer device, the computer device to implement the method of claim 11.

17. An X-ray diagnostic system, comprising:
an X-ray detector including an active pixel matrix, the matrix including a first detector plate and at least one further detector plate, with pixel readout elements;
an X-ray source; and
a correction unit including at least one storage element and an image processing unit, the correction unit being provided to correct a raw X-ray image taken with the aid of the X-ray detector, in which, as a function of a deviation between correction values from pixel readout elements of the first detector plate and correction values from pixel readout elements of at least one further detector plate, at least one of the correction values of at least one detector plate are changeable and new correction values are prepareable for at least one detector plate via the correction unit, the correction unit further being provided to carry out correction of the raw X-ray image with at least one of the changed correction values, and the original correction values and the new correction values,
wherein the correction unit is provided to reduce the deviation by carrying out a normalization of correction values of a correction image, and to divide a further correction image electronically in pixel-wise fashion by the normalized correction image.

18. An X-ray diagnostic system for correcting a raw X-ray image of a digital X-ray detector including an active pixel matrix with pixel readout elements, the matrix including at least two detector plates, the system comprising:
means for at least one of
changing, as a function of a deviation between correction values from pixel readout elements of a first detector plate and correction values from pixel readout elements of at least one further detector plate, the correction values of pixel readout elements of at least one detector plate, and
preparing, as a function of a deviation between correction values from pixel readout elements of a first detector plate and correction values from pixel readout elements of at least one further detector plate, new correction values for the pixel readout elements of at least one detector plate;
means for at least one of
reducing deviation by carrying out a normalization of correction values of a correction image to a value of one, and dividing a further correction image electronically in pixel-wise fashion by the normalized correction image, and
determining deviation by a comparison of a mean value of correction values from pixel readout elements of the first detector plate with a mean value of correction values from pixel readout elements of at least one further detector plate; and
means for carrying out a correction of the raw X-ray image with at least one of the changed correction values, and the original correction values and the new correction values.

19. An X-ray diagnostic system, comprising:
an X-ray detector including an active pixel matrix, the matrix including a first detector plate and at least one further detector plate, with pixel readout elements;
an X-ray source; and
a correction unit including at least one storage element and an image processing unit, the correction unit being provided to correct a raw X-ray image taken with the aid of the X-ray detector, in which, as a function of a deviation between correction values from pixel readout elements of the first detector plate and correction values from pixel readout elements of at least one further detector plate, at least one of the correction values of at least one detector plate are changeable and new correction values are prepareable for at least one detector plate via the correction unit, the correction unit further being provided to carry out correction of the raw X-ray image with at least one of the changed correction values, and the original correction values and the new correction values,
wherein the correction unit is provided to determine the deviation by a comparison of a mean value of correction values from pixel readout elements of the first detector plate with a mean value of correction values from pixel readout elements of at least one further detector plate.

* * * * *